Aug. 18, 1936.  E. W. GLACY  2,051,695
TESTING OR INSPECTING MACHINE
Filed Dec. 12, 1931  4 Sheets-Sheet 1

INVENTOR:
EDWARD W. GLACY,
BY
HIS ATTORNEY.

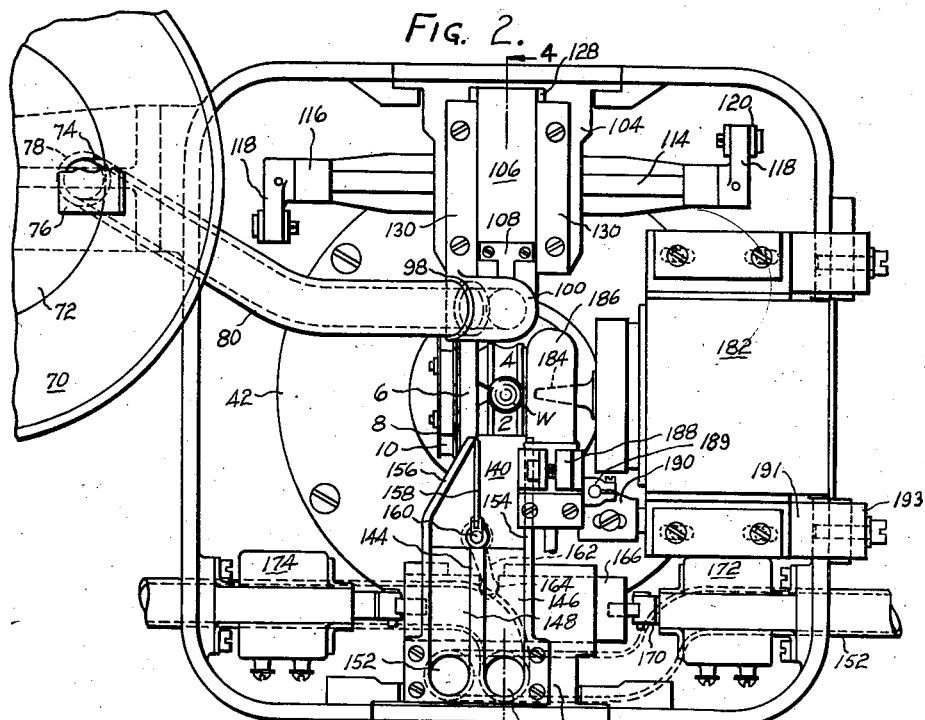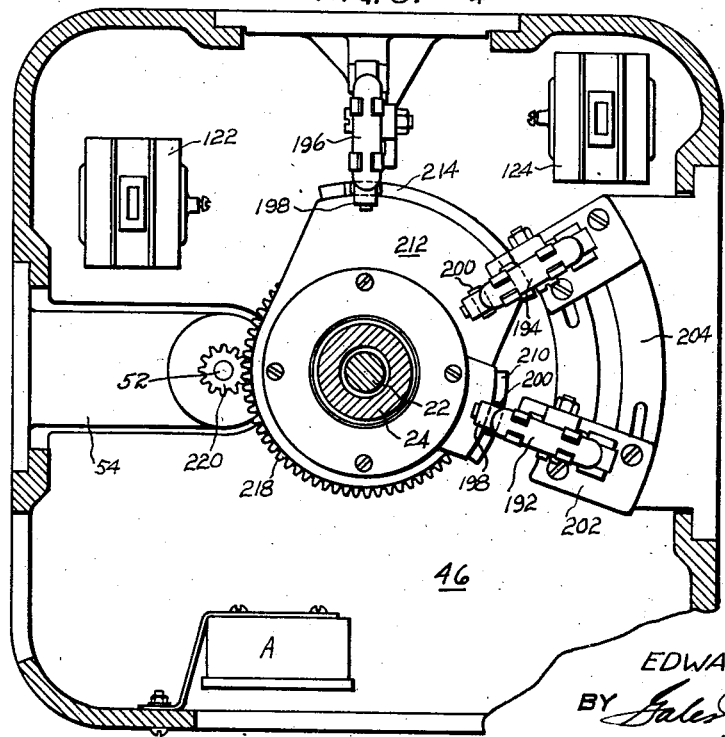

Aug. 18, 1936.  E. W. GLACY  2,051,695
TESTING OR INSPECTING MACHINE
Filed Dec. 12, 1931  4 Sheets-Sheet 3
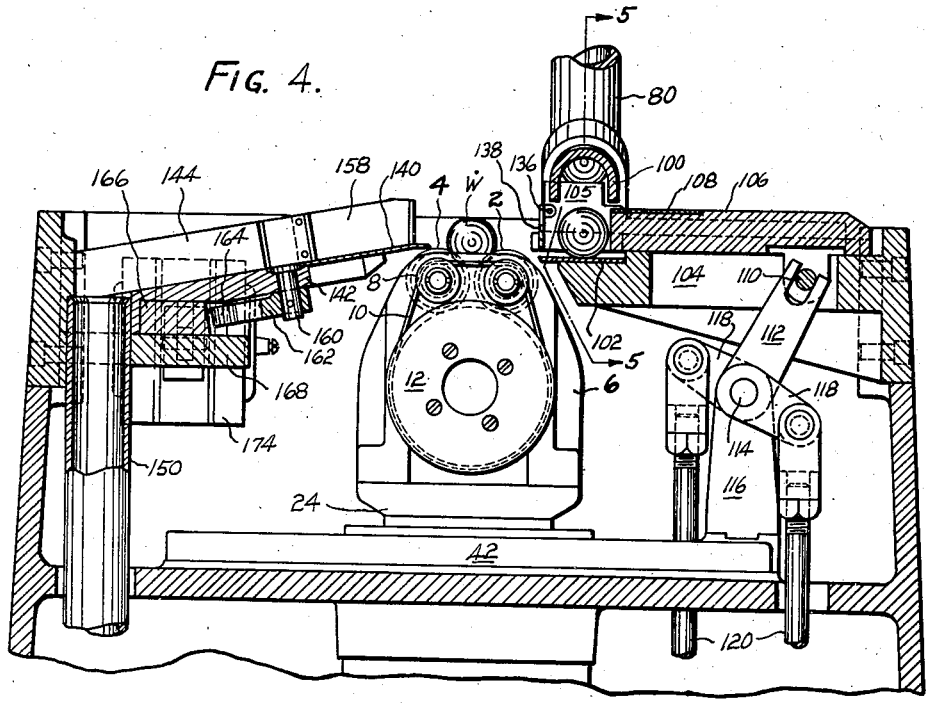
INVENTOR:
EDWARD W. GLACY,
BY
HIS ATTORNEY.

Aug. 18, 1936.

E. W. GLACY 2,051,695

TESTING OR INSPECTING MACHINE

Filed Dec. 12, 1931

INVENTOR:
EDWARD W. GLACY,
BY
HIS ATTORNEY.

Patented Aug. 18, 1936

2,051,695

UNITED STATES PATENT OFFICE 2,051,695

TESTING OR INSPECTING MACHINE

Edward W. Glacy, Bristol, Conn., assignor, by mesne assignments, to General Motors Corporation, Detroit, Mich., a corporation of Delaware Application December 12, 1931, Serial No. 580,719

25 Claims. (Cl. 209—111)

This invention relates to testing or inspecting machines and comprises all of the features of novelty herein disclosed. An object of the invention is to provide an improved machine for testing or inspecting the quality of a surface such as the smoothness and uniformity of antifriction bearing parts. Another object is to provide an efficient and practicable testing or inspecting machine for rapidly and automatically detecting imperfections in the surfaces of a run of similar articles and segregating the acceptable ones. Another object is to provide an improved article supporting and turning mechanism for exposing different areas of an article for treatment. Still another object is to provide improved mechanism for successively delivering articles to a carrier for inspection and removing them after inspection. Yet another object is to provide an improved article inspecting machine wherein a ray of radiant energy reflected from the surfaces of the articles controls the segregation of the articles in accordance with the nature of such surfaces.

To these ends and also to improve generally upon devices of this character, the invention consists in the various matters hereinafter described and claimed. In its broader aspects, the invention is not necessarily limited to the specific construction selected for illustrative purposes in the accompanying drawings in which Fig. 1 is a front view of the machine, some parts being broken away and others being in vertical cross section.

Fig. 2 is a plan view to larger scale than Fig. 1, some parts being broken away.

Fig. 3 is a horizontal cross sectional view, about on line 3—3 of Fig. 1, some parts being removed.

Fig. 4 is a vertical cross sectional view, about on line 4—4 of Fig. 2, of the article-advancing and segregating mechanism, the turn-table being turned to a different position.

Fig. 5 is a vertical sectional view about on line 5—5 of Fig. 4.

Figure 1:
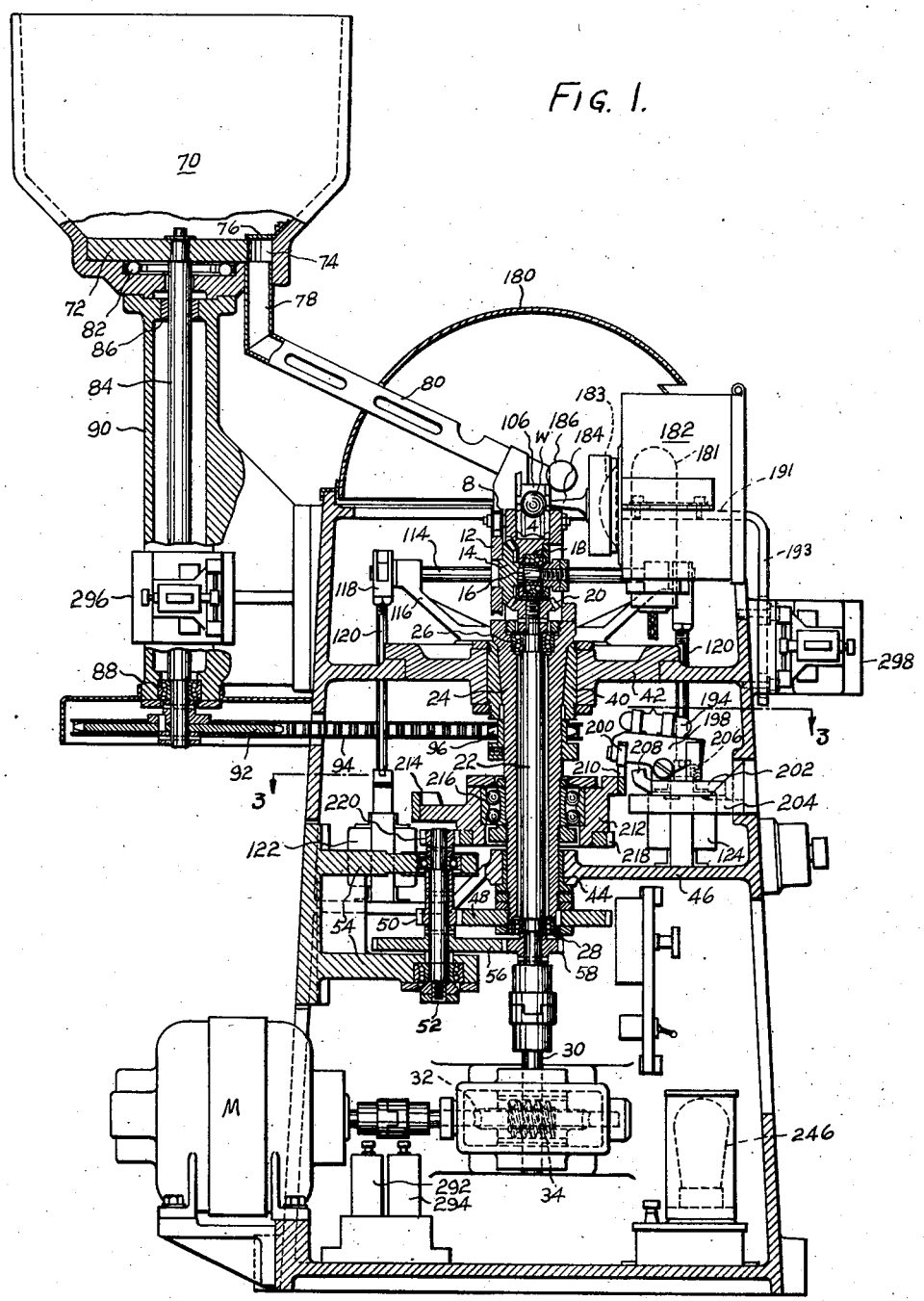

*Work supporting and rotating mechanism.*—See Figs. 1, 2 and 4

The work W to be inspected, such as a steel ball, is rotated around two different axes simultaneously in order to present all points in its surface to a ray of light. The ball is rotated comparatively fast around a horizontal axis by a pair of grooved rollers 2 and 4 journalled in the arms of a yoke or carrier 6 and each having a small pulley 8 driven by a belt 10 from a large pulley 12. The rollers turn in the same direction around their axes which are preferably parallel. The pulley 12 is secured to a bevel gear 14 on a stud shaft 16 journalled in a double row ball bearing 18 housed in a recess of the yoke or carrier 6. The bevel gear is driven by a bevel pinion 20 secured to a vertical drive shaft 22 journalled in a rotatable sleeve 24 by antifriction bearings 26 and 28. The drive shaft 22 is coupled to a shaft 30 having a worm wheel 32 driven by a worm 34 connected to the shaft of an electric motor M.

To rotate the work piece around a vertical axis, the yoke or carrier 6 acts as a turn-table, being mounted on the upper end of the rotating sleeve 24 which is journalled near its upper end in a tapered bushing 40 adjustably carried in the bore of a supporting ring 42. The sleeve 24 is also journalled in a bushing 44 carried by a web 46 of the machine frame and carries a gear 48 driven by a pinion 50 pinned to a vertical counter shaft 52 journalled in antifriction bearings on supporting arms 54 of the frame. A gear 56 pinned to the shaft 52 is driven by a pinion 58 on the shaft 22. The gearing causes the rollers 2 and 4 and the work to revolve bodily around a vertical axis at a speed which is preferably slow compared to the speed at which the rollers and the work rotate around a horizontal axis.

*Work feeding mechanism.*—See Figs. 1, 2, 4 and 5

The work-pieces W are supplied in bulk to a hopper 70 having its bottom wall formed by a rotating disc 72 which has one or more peripheral notches 74 for the work. As the disc revolves, each notch carries an article under a guard plate 76 which prevents the remaining articles from interfering with the dropping of the article into a vertical chute or tube 78 leading to an inclined chute or tube 80. The disc 72 is supported for rotation by a thrust bearing 82 and is secured to a vertical drive shaft 84 journalled in a bushing 86 and in a double row ball bearing 88 carried by a hollow bracket 90. The lower end of the shaft carries a sprocket wheel 92 driven by a sprocket chain 94 from a sprocket wheel 96 on the sleeve 24. The speed and the number of notches 74 in the disc are so selected as to insure the feed of a ball into the chute at least as often as an inspection operation is performed.

The inclined chute 80 is supported by a bracket 98 carrying a downwardly open guard or chute extension 100 to direct an article onto a supporting plate 102 carried on an extension of a slotted bracket 104 fastened to the frame. The article is temporarily arrested at the end of the chute 80 by a side plate or blade 105 carried on a sliding plunger 106 but, as the plunger advances towards the rollers 2 and 4, the article drops onto a wear plate 108 on the top of the plunger. In the subsequent retraction of the plunger, the article drops onto the supporting plate 102 ready for lateral feeding to the rollers on the next advance of the plunger. The plunger has a depending lug carrying a pin 110 engaging the fork of an arm 112 on a rock shaft 114 supported in brackets 116 on the ring 42. The ends of the rock shaft carry oppositely directed arms 118 pivotally connected by rods 120 to the core pieces of solenoids 122 and 124. As will appear from the diagram, the solenoids are alternately energized to advance and retract the plunger 106.

The plunger has side lips 128 guided by plates 130 one of which is conveniently formed on the bracket 98, the two plates being secured to the bracket 104 by screws. In addition to the side plate or blade 105, the plunger has an opposing side wall 134, the side plate or blade and the side wall projecting beyond the end of the plunger to form an article recess to retain the article in position for feeding. The projecting ends of the side plate or blade and the side wall carry a pivot pin 136 for a swinging gate or ejector 138 which pushes the inspected article from the rollers 2 and 4 onto an inclined discharge plate 140. At the same time that the gate is ejecting the inspected article, the plunger 106 is advancing another or second article onto the rollers and the advancing side plate or blade 105 is releasing a third article from the chute 80 onto the wear plate 108. Upon the retraction of the plunger, the gate or ejector 138 swings open and drags back over the article which is on the rollers, the depression or recess between the two spaced rollers affording the resistance which makes the article stay on the rollers and open the gate. Also, as the plunger is retracted, the top wear plate 108 is withdrawn to permit the third article to drop down onto the supporting plate 102 and the side plate or blade 105 then arrests the next or fourth article in the tube 80. It will also be noted that if the plunger is retracted when the revolving yoke or carrier 6 has placed the rollers in a position other than perpendicular to the plunger, the side walls of the grooves in the rollers will furnish the resistance to keep the article on the rollers as the gate opens.

*Segregation of acceptable articles.—See Figs. 2 and 4*

The inclined discharge plate 140 is carried by a bracket 142 having a partition 144 forming compartments 146 and 148. The first compartment 146 guides the acceptable articles to a discharge chute 150, which may carry them directly to a gauging machine, and the second compartment 148 guides the other articles to a discharge chute 152. The compartment 146 has a straight side wall 154 and the compartment 148 has a side wall 156 which is bent laterally. In line with the partition 144 is a butterfly valve or deflector 158 on a vertical stud 160 which is rockably journalled on the bracket 142 and rocked by an arm 162 having a rounded knob 164 entering a notch in the side of a slide 166. The slide is guided in a slot of the bracket 142 while supported on a plate or shelf 168. The ends of the slide are connected to the core pieces 170 of solenoids 172 and 174.

As will later appear, the solenoid 172 is momentarily energized on every inspection but will only actuate the slide 166 when the slide has been previously pulled away from it by the solenoid 174. In other words, the normal position of the deflector 158 is that indicated in Fig. 2 and the deflector is not moved from such position unless the solenoid 174 is energized after the momentary energizing of solenoid 172 has ceased.

*Inspection mechanism.—See Figs. 1, 2 and 3*

The work surface is inspected by a ray of radiant energy reflected to a sensitive cell. A hood or dome 180 encloses the work moving mechanism to keep out extraneous light but an electric light 181 in a box 182 and a condensing lens 183 direct a concentrated ray of light through a nozzle 184 to a small area of the ball or other article in a direction other than radial so that the ray is reflected by the article to a photo-electric cell 186 which provides the "eye" which controls inspection. The reflected ray becomes considerably enlarged at the cell due to the convex mirror effect of the ball surface. The cell can be adjusted around its axis to present its window to the light and is held in adjusted position by a clamp 188. The clamp is also vertically adjustable on a post 189 carried by a plate 190. The plate 190 is slotted for horizontal adjustment on a bracket 191 which also adjustably carries the box 182. The bracket 191 has a vertically slotted supporting leg 193 so that it can be secured in vertically adjusted position on the frame by clamping bolts. By these adjustments, any desired relation of light rays to work surfaces can be obtained and the angle between the incident and the reflected rays can be adapted to the shape or size of the articles.

Suitable cam operated mercury switches 192, 194 and 196 control the various solenoids. Each switch is carried by a lever 198 carrying a cam roller follower 200 and each lever is pivoted to a bracket 202. Two of the brackets are angularly adjustable on an arcuate support 204. Each switch lever is pressed by a coil spring 206 against or towards a stop 208. The switches 192 and 194 have their stops so located that the springs normally hold the switches open but switch 196 is normally held closed.

A cam 210 is secured to a revolving cam carrier 212 in a position to momentarily operate the switches 192 and 194 successively, the carrier rotating in such a direction that the switch 192 closes and opens before the switch 194 closes and opens. A cam 214 of considerable circumferential extent is adjustably secured to the cam carrier at a lower level than cam 210 in a position to open and hold open the switch 196 during the interval between the operation of the switches 192 and 194. This is to prevent any effective action of the sensitive cell during actuation of the plunger as will appear. The cam carrier is journalled for rotation around the sleeve 24 by a double row ball bearing 216 and carries a gear 218 driven by a pinion 220 on the upper end of the countershaft 52. The cam carrier is preferably rotated at a little slower speed than the sleeve 24, as by making pinion 220 smaller than the pinion 50, in order to insure at least one complete revolution of the carrier 6 during the inspection of an article. For a run of larger or smaller articles, the carrier 6 can be replaced by another in which the rollers 2 and 4 have a diameter, spacing and speed suited to the new work.

Figure 6:
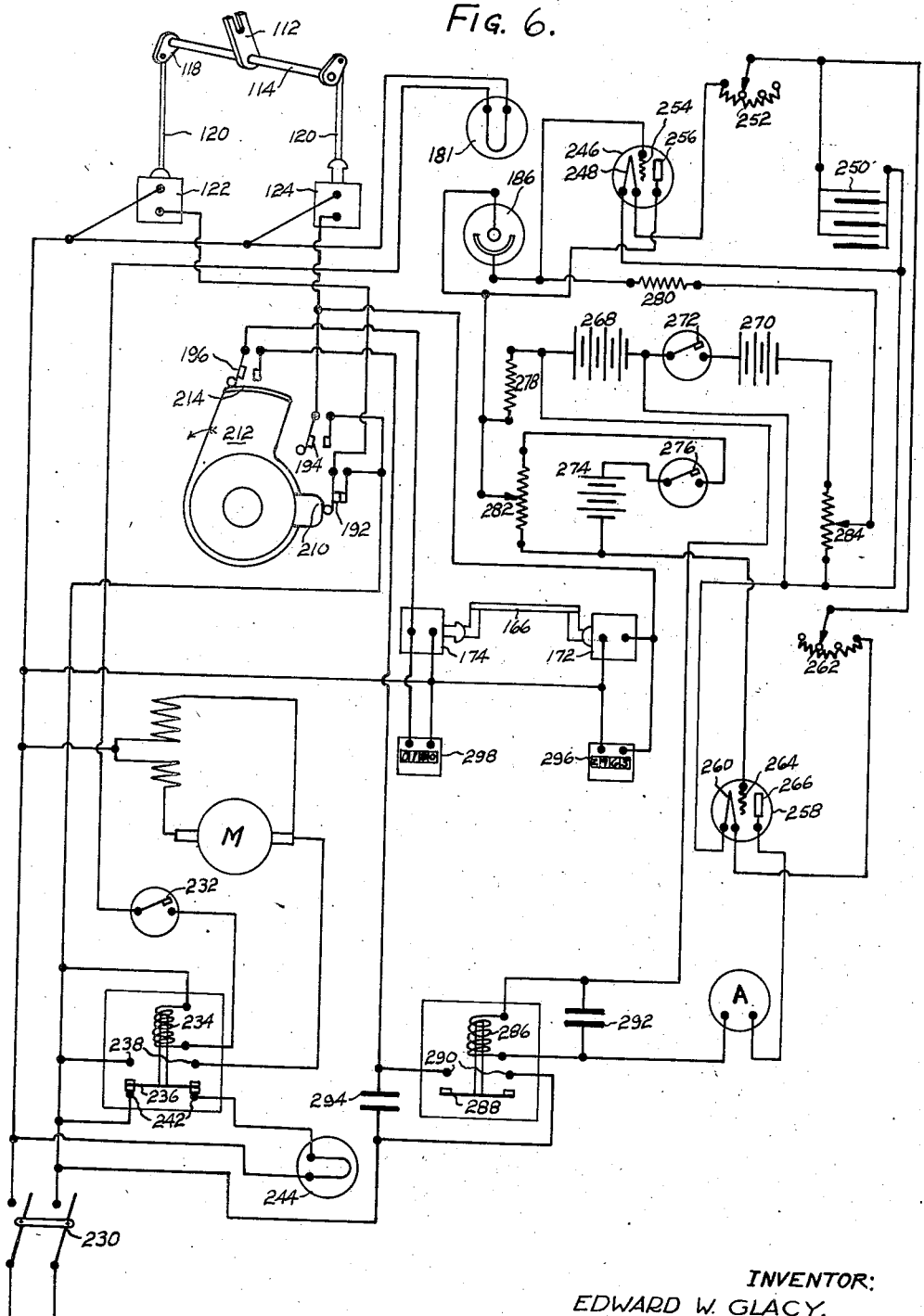
Fig. 6 is a diagram.

Diagram.—See Fig. 6

A power line, such as 110 volt direct current, is controlled by a double-pole switch 230. The machine is started by a switch 232 which energizes a relay 234 and causes a switch blade 236 to connect contacts at 238. This starts the motor M and lights the lamp 181 which provides the inspecting ray of light coming from the box 182. As a signal to the operator that the machine is not operating, as if the light burns out and breaks the circuit through the relay 234, the switch blade 236 will move to connect the contacts at 242 and light a red signal lamp 244. The photoelectric cell 186 is very sensitive to light or to a change in the intensity thereof. To increase the flow of current in order to be able to control an inspection, a multi-stage resistance-coupled amplifying hook-up is employed similar to that employed in the radio industry. An amplifying tube 246 has the usual filament 248 illuminated, as by a six volt A-battery 250, and controlled by a rheostat at 252. The tube has the usual grid 254 and the usual plate 256 wired to the cell terminals. Another amplifying tube 258 has its filament 260 illuminated by the battery 250 and controlled by the rheostat at 262. This tube has the usual grid 264 and plate 266. The hook-up also comprises a B-battery 268, of say 90 volts, a C-battery 270, of say 45 volts, and a control switch 272; there is also a D-battery 274, of say 45 volts, controlled by a switch 276. Suitable resistance units are indicated at 278 and 280, and potentiometers at 282 and 284 for adjusting the current which is indicated by a milliammeter A in the circuit leading to a relay coil 286 of a switch blade 288 which is arranged to connect contacts at 290. Condensers are located as indicated at 292 and 294. The contacts at 290 remain unconnected unless there is a change in the intensity of light reaching the photoelectric cell after reflection from the article but any change in current is amplified so that the relay is actuated. Such change occurs when the reflecting surface is imperfect, otherwise not. Sensitivity can be increased by more amplifiers, by more photoelectric cells or in any other desired manner.

The operation of the machine is as follows: The cam 210, moving counterclockwise, momentarily closes the mercury switch 192 and energizes the solenoid 122 to actuate the feed plunger 106 to transfer an article, such as a steel ball, to the supporting rollers. The preceding and inspected article is simultaneously ejected. The cam 210 next momentarily closes the mercury switch 194 and energizes the solenoid 124 to retract the feed plunger. The mercury switch 194 also momentarily closes a circuit energizing the solenoid 172 and this moves the deflector 158 to its normal position if it is not already in such normal position. Meanwhile the cam 214 has opened (and has been holding open) the mercury switch 196 to prevent any effective action of the sensitive cell 186 but, as the cam 210 passes and opens switch 194, cam 214 releases and thereby closes switch 196. This makes ready for a completion of a circuit through the solenoid 174 which will be energized provided the switch relay 286 is actuated by the sensitive cell and amplifiers. The ball turns in every direction to present every portion of its area to the ray of light coming through the nozzle 184 from the light 181. If the ball is perfectly spherical and smooth and carries no dust, the intensity of light reflected to the photo-electric cell remains uniform and the cell is unaffected. Accordingly, when the cam 210 goes around and again closes switch 192 and initiates advance of the plunger, the inspected and perfect ball is ejected from the rollers and goes into the chute 150 for the acceptable articles. On the other hand, if the ball undergoing inspection is imperfect, the resulting change in intensity of reflected light affects the cell and, by means of the amplifiers, the relay 286 is energized and the contacts 290 are connected. This completes a circuit through the closed switch 196 and the solenoid 174, and the deflector 158 is swung over by the slide 166 ready to deflect the imperfect ball into the chute 152 for unacceptable articles. Then when the cam 210 momentarily closes the switch 192, the solenoid 122 advances the plunger and ejects the ball from the rollers to the chute and advances the next ball to the same inspecting position. The switch 196 is also opened by the cam 214. The deflector, having been swung over by the solenoid 174 to deflecting position, remains there until the cam 210 has closed the second switch 194 to energize the solenoid 172 for returning the deflector to normal position. When switch 194 is closed, the solenoid 124 is also momentarily energized to retract the plunger and thereafter the switch 196 closes to make ready the inspection circuit for the next article. As an aid in keeping track of uniformity in the product, a counter 296 is connected up in parallel with the solenoid 172 and registers the total number of balls passing through the machine. Another counter 298 connected in parallel with the solenoid 174 registers the number of rejected balls.

Not only does the machine test or inspect the uniformity in smoothness or polish of a surface but, in the case of a ball, it detects any lack of sphericity because a change in the direction of reflected light will affect the photo-electric cell. Rotation of the supporting rollers presents a zone of the surface to the light ray and the slow revolution of the carrier continually alters the zone so that every portion of the area of the article is exposed. Raceways and other surfaces may be inspected if the relation of the surfaces to the impinging ray and the reflected ray be kept constant.

I claim:

1. In apparatus of the character described, an article support comprising a driven roller for supporting and rolling contact with the surface of a round article to rotate the latter around an axis, a carrier rotatably supporting the driven roller, and means for rotating the carrier around an axis which intersects the article; substantially as described.

2. In apparatus of the character described, an article support comprising a pair of spaced rollers peripherally supporting the article for rotation on an axis, means for rotating at least one of the rollers to rotate the article by rolling contact therewith, a turntable carrying the rollers and having an axis coinciding with a second axis of the article, and means for rotating the turntable; substantially as described.

3. In apparatus of the character described, an article support comprising a driven roller peripherally engaging the surface of an article for turning the article around one axis, a carrier rotatably supporting the roller, means for rotating the carrier to turn the article around another axis, and an inspection device mounted in a predetermined relation to said axes; substantially as described.

4. In apparatus of the character described, an article support comprising a pair of rollers peripherally supporting the article for rotation, a carrier rotatably supporting the rollers, a hollow sleeve for turning the carrier, and means extending through the sleeve for rotating at least one of the rollers; substantially as described.

5. In apparatus of the character described, an article support comprising a pair of rollers peripherally supporting the article for rotation on an axis, a carrier rotatably supporting the rollers and itself having an axis of rotation, roller driving means extending through the axis of rotation of the carrier, and means for turning the carrier; substantially as described.

6. In apparatus of the character described, an inspection device, rollers for supporting and rotating an article for action by the inspection device, a combined feeding and ejecting member for ejecting an article from the supporting rollers and delivering another article to the same supporting rollers, and means for reciprocating the member; substantially as described.

7. In apparatus of the character described, an inspection device, rollers for supporting and rotating an article for action by the inspection device, a plunger having a gate, and means for actuating the plunger to eject an article from the supporting rollers and to deliver another article to the supporting rollers; substantially as described.

8. In apparatus of the character described, an inspection device for round articles, rotatable means for supporting such an article for action by the inspection device, a reciprocating plunger movable with respect to the supporting means, mechanism for actuating the plunger to deliver an article onto the supporting means, a gate pivoted to the plunger to eject an inspected article from the supporting means, and the article supporting means having a depression or recess forming a holder arranged to retain the delivered article in position to open the gate; substantially as described.

9. In apparatus of the character described, an inspection device, means comprising rollers peripherally engaging and turning an article to bring different areas into the same relation to the inspection device, a feeding and ejecting device for ejecting an inspected article from the supporting and turning rollers and for delivering another article to the supporting and turning rollers, and means for actuating said device; substantially as described.

10. In apparatus of the character described, an inspection device, means for supporting and turning an article around two different axes within the body of the article to bring all portions of the surface into the same relation to the inspection device, said means comprising a rotary carrier and a member rotatable on the carrier, in combination with means for delivering articles successively to the member; substantially as described.

11. In apparatus of the character described, an inspection device, an article support having an upwardly open recess to receive an article by gravity, means for turning the support around an axis to present the surface of the article to the inspection device, means for maintaining the center of the article at the same distance from the inspection device, and means for advancing articles successively onto the turning support at the same inspecting position and ejecting them therefrom in any position of rotation of the support; substantially as described.

12. In apparatus of the character described, an article support, means for turning the support through at least one revolution to expose different areas of the article for inspection, means for causing inspection of the article during turning of the support, and means for ejecting an inspected article from the support after completion of the operation, said last means comprising a controlling cam coaxial with the article support and revolving at slower speed than the work support to insure a full revolution of the article support; substantially as described.

13. In apparatus of the character described, an article support, means for rotating the support with an article thereon, mechanism for inspecting an article on the support and comprising a device for directing a ray of light to the article for reflection, a light sensitive cell arranged to receive the reflected ray in any position of rotation of the article, and means for adjusting the angle between the rays in accordance with the size or contour of the article; substantially as described.

14. In apparatus of the character described, an inspection device, and means for delivering articles successively to inspecting position and comprising a chute for a stream of articles, a plunger movable across the delivery end of the chute, the plunger having an article pushing surface to engage one article and an obstruction to arrest the remaining articles, means for advancing the plunger to deliver the one article to inspecting position and to remove the obstruction, the plunger also having a supporting surface for the article released by the obstruction, means for retracting the plunger to remove the supporting surface and thereby transfer the supported article to a position ready for advance, and an ejector carried by the plunger for removing the inspected article; substantially as described.

15. In mechanism for successively advancing articles to a support for treatment and for ejecting them from the support after treatment, a chute for a stream of articles, a plunger movable across the delivery end of the chute, the plunger having an article pushing surface to engage one article and an obstruction to arrest the remaining articles, means for advancing the plunger to deliver the one article to inspecting position and to remove the obstruction, the plunger also having a supporting surface for the article released by the obstruction, and means for retracting the plunger to remove the supporting surface and thereby transfer the supported article to a position ready for advance; substantially as described.

16. In apparatus of the character described, an article support comprising means for rotating an article around two different internal and intersecting axes simultaneously to bring all points in the surface successively to a definite location, and means acting at the definite location for treating the surface without affecting said rotation of the article; substantially as described.

17. In apparatus of the character described, an inspection device, a support comprising means for rotating a ball around intersecting diameters simultaneously to bring all points in the spherical surface thereof into the same relation to the inspection device, and means for causing the said device to control an ejection of the ball from the support in a path determined by the nature of the surface; substantially as described.

18. In an apparatus of the character described, an inspection device, a pair of rollers for supporting and rotating a ball around an axis, and means for gradually shifting said axis without bodily moving the ball to bring all points on the surface of the ball into the same relation to the inspection device; substantially as described.

19. In apparatus of the character described, an inspection device, an article support comprising a pair of rollers and a carrier therefor, means for turning the carrier around an axis which extends between the pair of rollers and means movable towards and from said axis, for successively delivering articles to said pair of rollers in any position of rotation of the carrier; substantially as described.

20. In apparatus of the character described, an inspection device, and means for delivering articles successively to inspecting position and comprising a chute for a stream of articles, a reciprocating plunger having a pushing surface, an obstructing wall projecting forwardly from the plunger and edgewise into the chute to retain articles in the chute when the plunger is retracted, a gate having a support on said forwardly projecting wall, and means for advancing the plunger to advance an article and to remove the obstruction; substantially as described.

21. In apparatus of the character described, an inspection device, and means for delivering articles successively to inspecting position and comprising a chute for a stream of articles, a reciprocating plunger having a pushing surface, an obstructing wall projecting from the plunger in advance of its pushing surface to retain articles in the chute when the plunger is retracted, a supporting surface on the plunger and extending rearwardly from the pushing surface, and means for advancing the plunger to advance an article and to remove the obstruction and thereby admit an article to the supporting surface; substantially as described.

22. In apparatus of the character described, an inspection device, and means for delivering articles successively to inspecting position and comprising a chute for a stream of articles, a plunger having an article recess with an article-obstructing wall forming one side wall of the recess, a supporting surface on the plunger in rear of the recess, and means for advancing the plunger to remove the obstructing wall from the chute to thereby admit an article onto the supporting surface; substantially as described.

23. In apparatus of the character described, mechanism for inspecting a ball, said mechanism comprising a source of radiant energy and a member sensitive thereto, means for concentrating the rays of energy and directing them substantially as a single beam to a small spot on the surface of the ball, means for supporting the ball in a position to receive such single beam non-radially whereby the spot reflects the beam in a different direction to the sensitive member and the convexity of the spot magnifies the beam at such member, and means for rotating the ball around two different axes simultaneously to bring every spot on the surface thereof into the same inspecting position; substantially as described.

24. In an apparatus of the character described, an inspection device, a pair of laterally spaced rollers peripherally engaging and supporting an article thereon with the center of the article in a constant relation to the inspection device, means on the rollers for preventing the article from shifting lengthwise thereof, means for continuously rotating at least one of the rollers to turn the article around its center, an ejector for expelling the article from the supporting rollers, and means controlled by the inspection device for determining the path of the article upon ejection from the rollers; substantially as described.

25. In an apparatus of the character described, rotating rollers peripherally engaging an article and turning it around an internal axis, a carrier for the rollers, means for turning the carrier around an axis intersecting said first axis at the center of the article whereby all portions of the surface of the article are brought to a definite location, and a device acting at said definite location for inspecting the article; substantially as described.

EDWARD W. GLACY.